(12) United States Patent
Bondy

(10) Patent No.: US 11,597,027 B2
(45) Date of Patent: Mar. 7, 2023

(54) THERMAL INSULATING PLATES FOR WELDING TORCHES

(71) Applicant: ILLINOIS TOOL WORKS INC., Glenview, IL (US)

(72) Inventor: Craig Matthew Bondy, Windsor (CA)

(73) Assignee: ILLINOIS TOOL WORKS INC., Glenview, IL (US)

( * ) Notice: Subject to any disclaimer, the term of this patent is extended or adjusted under 35 U.S.C. 154(b) by 116 days.

(21) Appl. No.: 16/962,909

(22) PCT Filed: Feb. 27, 2018

(86) PCT No.: PCT/US2018/019890
§ 371 (c)(1),
(2) Date: Jul. 17, 2020

(87) PCT Pub. No.: WO2019/168497
PCT Pub. Date: Sep. 6, 2019

(65) Prior Publication Data
US 2021/0060687 A1    Mar. 4, 2021

(51) Int. Cl.
*B23K 9/133*    (2006.01)
*B23K 9/28*    (2006.01)
*B23K 9/29*    (2006.01)

(52) U.S. Cl.
CPC ............ *B23K 9/1336* (2013.01); *B23K 9/287* (2013.01); *B23K 9/295* (2013.01)

(58) Field of Classification Search
CPC ...... B23K 9/1336; B23K 9/173; B23K 9/287; B23K 9/295; B23K 9/32

(Continued)

(56) References Cited

U.S. PATENT DOCUMENTS 2,424,437 A    7/1947    Dent
2,808,498 A    10/1957    Hudson
(Continued)

FOREIGN PATENT DOCUMENTS

CN    205309528    6/2016
CN    107225311    10/2017

OTHER PUBLICATIONS

Canada Patent Office, Office Action, Application No. 3,091,923, dated Oct. 12, 2021, 2 pages.
(Continued)

*Primary Examiner* — Dana Ross
*Assistant Examiner* — James F Sims, III
(74) *Attorney, Agent, or Firm* — McAndrews, Held & Malloy, Ltd.

(57) ABSTRACT

Some examples of the present disclosure relate to welding torches having a thermal insulating plate (400). The thermal insulating plate is comprised of a thermally insulating material, and is positioned between a front housing (302) and a drive gearbox (324) of the welding torch. The front housing (302) is connected to a gooseneck that conducts electrical energy to a torch tip (i.e. front end) of the welding torch. The drive gearbox (324) includes a gear assembly configured to drive a drive roll that moves a wire electrode through the welding torch (e.g. toward the torch tip of the torch). The thermal insulating plate (400) acts as a heat dam to decrease and/or reduce thermal energy transfer from the torch tip of the welding torch (e.g. via the front housing) towards the rear of the welding torch (e.g. through the drive gearbox), where the thermal energy may heat the welding torch handle and/or damage some of the more expensive and/or sensitive components in the handle (e.g. a motor of the drive gearbox).

19 Claims, 5 Drawing Sheets

(58) Field of Classification Search
USPC ..................................................... 219/137.2
See application file for complete search history.

(56) References Cited

U.S. PATENT DOCUMENTS

| | | | |
|---|---|---|---|
| 3,728,514 A | 4/1973 | Bernard et al. | |
| 5,519,185 A | 5/1996 | Kleppen | |
| 6,634,854 B1 | 10/2003 | Albrecht et al. | |
| 6,707,004 B2* | 3/2004 | Matiash | B23K 9/32 |
| | | | 219/137.9 |
| 6,998,575 B1 | 2/2006 | Kensrue | |
| 7,238,918 B2* | 7/2007 | Matiash | B23K 26/211 |
| | | | 242/615.3 |
| 7,285,746 B2* | 10/2007 | Matiash | B23K 9/32 |
| | | | 242/615.3 |
| 7,374,074 B2* | 5/2008 | Matiash | B23K 26/211 |
| | | | 242/615 |
| 7,390,989 B2* | 6/2008 | Matiash | B23K 26/211 |
| | | | 226/193 |
| 7,531,768 B2* | 5/2009 | Matiash | B23K 9/1336 |
| | | | 242/615.3 |
| 8,642,922 B2 | 2/2014 | Flattinger | |
| 2005/0218130 A1 | 10/2005 | Kensrue | |
| 2005/0224486 A1* | 10/2005 | Matiash | B23K 9/1336 |
| | | | 219/137.7 |
| 2005/0224550 A1 | 10/2005 | Mattiash | |
| 2014/0097166 A1 | 4/2014 | Flattinger et al. | |
| 2017/0021443 A1* | 1/2017 | Garvey | B23K 9/1336 |

OTHER PUBLICATIONS

International Search Report and Written Opinion for PCT Patent Application No. PCT/US2018/019890 dated Dec. 18, 2018. 9 Pages.

* cited by examiner

THERMAL INSULATING PLATES FOR WELDING TORCHES

TECHNICAL FIELD

The present disclosure generally relates to welding torches, and, more particularly, to thermal insulating plates for welding torches.

BACKGROUND

Welding torches generate substantial amounts of thermal energy (i.e. heat). Much of the thermal energy is generated at a torch tip of the welding torch. The torch may conduct the thermal energy generated at the torch tip back into the welding torch handle. The thermal energy may result in a heating of welding components within the welding torch handle, which may damage the welding components. The thermal energy may also make the handle itself hot, which may be uncomfortable for an operator holding the handle.

BRIEF SUMMARY

Systems and methods are provided for thermal insulating plates for welding torches, substantially as shown in and/or described in connection with at least one of the figures, as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, similar or identical reference numerals are used to refer to similar or identical components.

DETAILED DESCRIPTION

Figure 1:
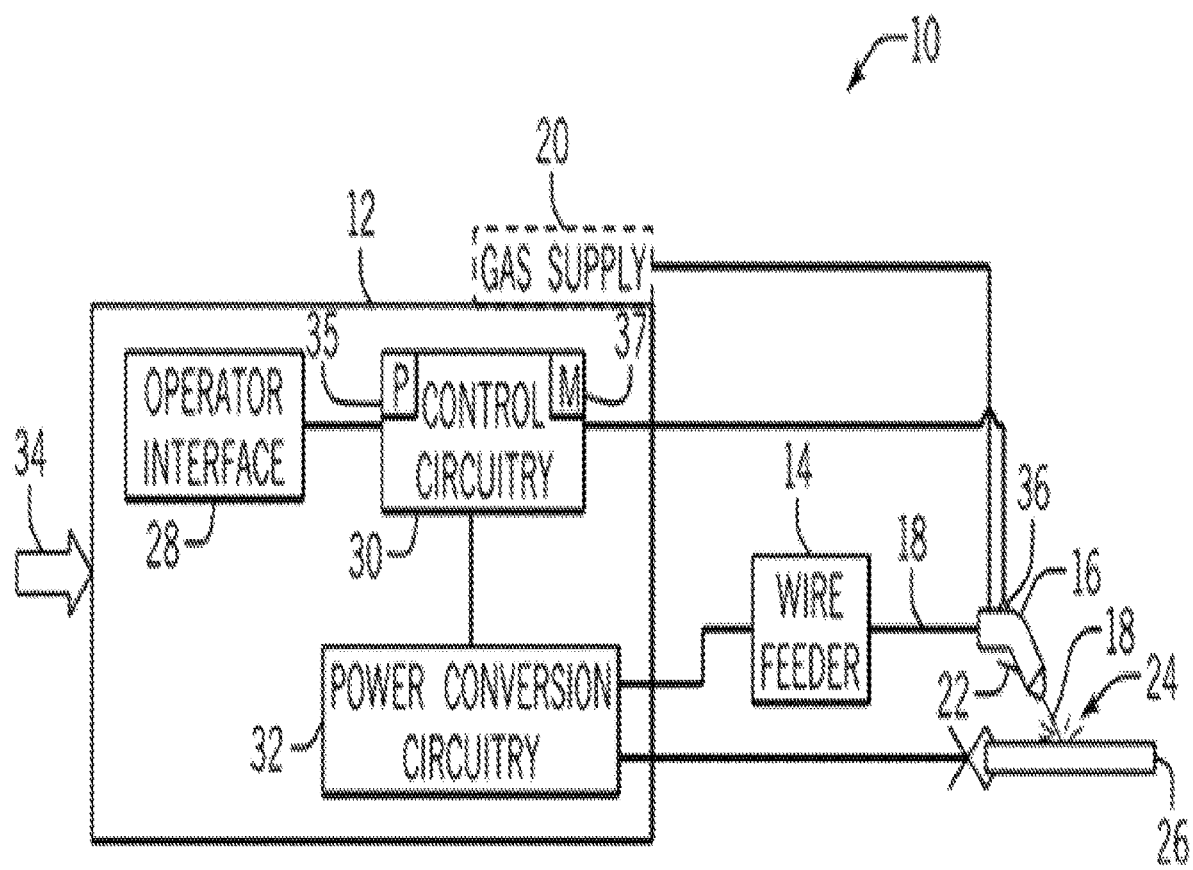
FIG. 1 is an example of a welding system, in accordance with aspects of this disclosure.

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the term "exemplary" means serving as a non-limiting example, instance, or illustration. As utilized herein, the terms "e.g.," and "for example" set off lists of one or more non-limiting examples, instances, or illustrations.

As used herein, a welding-type power supply and/or power source refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Welding-type power, as used herein, refers to power suitable for welding, cladding, plasma cutting, induction heating, CAC-A and/or hot wire welding/preheating (including laser welding and laser cladding), carbon arc cutting or gouging, and/or resistive preheating.

The terms "coupled," "coupled to," and "coupled with" as used herein, each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

The terms "about" and/or "approximately," when used to modify or describe a value (or range of values), position, orientation, and/or action, mean reasonably close to that value, range of values, position, orientation, and/or action. Thus, the embodiments described herein are not limited to only the recited values, ranges of values, positions, orientations, and/or actions but rather should include reasonably workable deviations.

As used herein, the terms "front" and/or "forward" refer to locations closer to a welding arc, while "rear" refers to locations farther from a welding arc.

Some examples of the present disclosure relate to a welding torch handle, comprising a front housing configured for coupling to a gooseneck, a drive gearbox comprising gears configured to drive a drive roll, and a thermal insulating plate positioned between the drive gearbox and the front housing, where the thermal insulating plate is comprised of a thermally insulating material.

In some examples, the front housing comprises an electrically conductive material. In some examples, the front housing comprises a cylindrical portion and a connecting plate portion, where the cylindrical portion comprises a threaded inner surface surrounding a bore, the threaded inner surface is configured to engage complementary threads of the gooseneck, and the connecting plate portion comprises bolt holes configured to receive bolts to connect the front housing to the drive gearbox. In some examples, the drive roll is configured to engage a welding wire, and the drive gearbox further comprises a threaded bolt hole configured to receive and engage a threaded bolt. In some examples, the welding torch handle further comprises a motor configured to drive the gears of the drive gearbox, the motor comprises a motor shaft, and the drive gearbox further includes a motor bearing that supports the motor shaft. In some examples, the motor bearing protrudes from the drive gearbox into a central bore of the thermal insulating plate. In some examples, the thermal insulating plate further comprises a pin hole configured to fit a dowel pin extending from the drive gearbox. In some examples, the thermal insulating plate comprises a bolt hole through which a bolt extends to connect the front housing to the drive gearbox. In some examples, the thermal insulating plate comprises a phenolic, thermoplastic, thermoset, or ceramic material. In some examples, the front housing, drive gearbox, and thermal insulating plate are positioned within an outer housing.

Some examples of the present disclosure relate to a welding torch, comprising a front housing coupled to a gooseneck, a drive gearbox comprising gears configured to drive a drive roll, and a thermal insulating plate positioned between the drive gearbox and the front housing, where the thermal insulating plate is comprised of a thermally insulating material.

In some examples, the front housing comprises an electrically conductive material. In some examples, the front housing comprises a cylindrical portion and a connecting plate portion, the cylindrical portion comprises a threaded inner surface surrounding a bore, the threaded inner surface engages complementary threads of the gooseneck to couple the front housing to the gooseneck, and the connecting plate portion comprises apertures configured to receive bolts to connect the front housing to the drive gearbox. In some examples, the drive roll is configured to engage a welding wire, and the drive gearbox further comprises threaded bolt holes configured to receive and engage threaded bolts. In some examples, a motor is configured to drive the gears of the drive gearbox, where the motor comprises a motor shaft, and wherein the drive gearbox further includes a motor bearing that supports the motor shaft. In some examples, the motor bearing protrudes from a housing of the drive gearbox into a central bore of the thermal insulating plate. In some examples, the thermal insulating plate further comprises pin holes configured to fit dowel pins extending from the drive gearbox. In some examples, the thermal insulating plate further comprises bolt holes through which bolts extend to connect the front housing to the drive gearbox. In some examples, the thermal insulating plate comprises a phenolic, thermoplastic, thermoset, or ceramic material. In some examples, the front housing, drive gearbox, and thermal insulating plate are positioned within an outer housing.

Some examples of the present disclosure relate to welding torches having a thermal insulating plate. The thermal insulating plate is comprised of a thermally insulating material, and is positioned between a front housing and a drive gearbox of the welding torch. The front housing is connected to a gooseneck that conducts electrical energy to a torch tip (i.e. front end) of the welding torch. The drive gearbox includes a gear assembly configured to drive a drive roll that moves a wire electrode through the welding torch (e.g. toward the torch tip of the torch). The thermal insulating plate acts as a heat dam to decrease and/or reduce thermal energy transfer from the torch tip of the welding torch (e.g. via the front housing) back towards the rear of the welding torch (e.g. through the drive gearbox), where the thermal energy may heat the welding torch handle and/or damage some of the more expensive and/or sensitive components in the handle (e.g. a motor of the drive gearbox).

FIG. 1 shows an example of a welding-type system 10 that may use the example welding torch, clasp, strain relief, and/or protective sleeve discussed above and/or below. While the specific welding-type system 10 of FIG. 1 is a gas metal arc welding (GMAW) system, other types of welding-type systems may be used. FIG. 1 illustrates the welding-type system 10 as including a welding-type power source 12 coupled to a wire feeder 14. In the illustrated example, the power source 12 is separate from the wire feeder 14, such that the wire feeder 14 may be positioned at some distance from the power source 12 near a welding location. However, it should be understood that the wire feeder 14, in some examples, may be integral with the power source 12. In some examples, the wire feeder 14 may be removed from the system 10 entirely. In the example of FIG. 1, the power source 12 supplies welding-type power to a torch 16 through the wire feeder 14. In some examples, the power source 12 may supply welding-type power directly to the torch 16 rather than through the wire feeder 14. In the example of FIG. 1, the wire feeder 14 supplies a wire electrode 18 (e.g., solid wire, cored wire, coated wire) to the torch 16. A gas supply 20, which may be integral with or separate from the power source 12, supplies a gas (e.g., $CO_2$, argon) to the torch 16. In some examples, no gas supply 20 may be used. An operator may engage a trigger 22 of the torch 16 to initiate an arc 24 between the electrode 18 and a work piece 26. In some examples, engaging the trigger 22 of the torch 16 may initiate a different welding-type function, instead of an arc 24.

In some examples, the welding system 10 may receive weld settings from the operator via an operator interface 28 provided on the power source 12 (and/or power source housing). The weld settings may be communicated to control circuitry 30 within the power source 12. In some examples, the control circuitry 30 operates to control generation of welding-type power for carrying out the desired welding-type operation. In the example of FIG. 1, the control circuitry 30 is coupled to the power conversion circuitry 32, which may supply the welding-type power (e.g., pulsed waveform) that is applied to the torch 16. In the example of FIG. 1, the power conversion circuitry 32 is coupled to a source of electrical power as indicated by arrow 34. The source may be a power grid, an engine-driven generator, batteries, fuel cells or other alternative sources. In some examples, the control circuitry 30 may control the current and/or the voltage of the welding-type power supplied to the torch 16. The control circuitry 30 may monitor the current and/or voltage of the arc 24 based at least in part on one or more sensors 36 within the wire feeder 14 and/or torch 16. In some examples, a processor 35 of the control circuitry 30 may determine and/or control the arc length or electrode extension based at least in part on feedback from the sensors 36. The processor 35 may determine and/or control the arc length or electrode extension utilizing data (e.g., algorithms, instructions, operating points) stored in a memory 37. The data stored in the memory 37 may be received via the operator interface 28, a network connection, or preloaded prior to assembly of the control circuitry 30.

Figure 2:
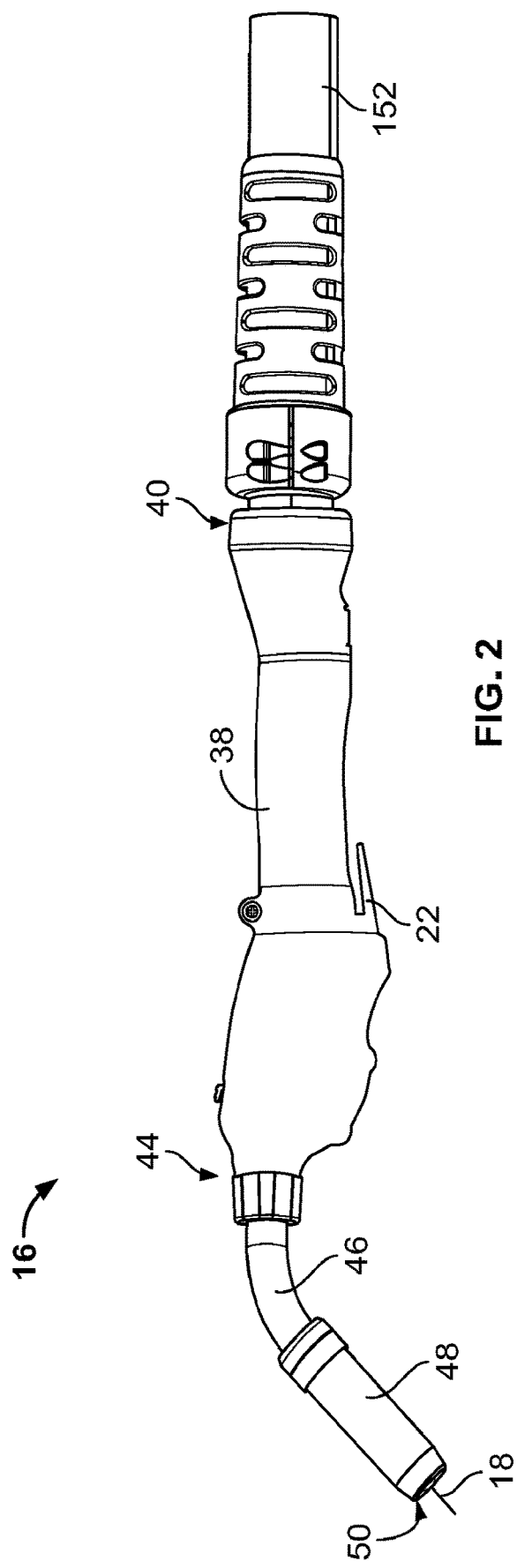
FIG. 2 is a side view of an example welding torch used the welding system of FIG. 1, in accordance with aspects of this disclosure.

FIG. 2 is an example welding torch 16 that may be used in and/or with the example welding system of FIG. 1. The torch 16 includes a handle 38 that a welding operator may hold when performing a weld. The handle 38 includes a front end 44 and a rear end, 40. A trigger 22 is attached to the handle between the front end 44 and rear end 40.

At the rear end 40, the handle 38 is coupled to a cable assembly 152. The cable assembly 152 may include one or more cables (e.g., conductors, conductor bundles, etc.), wires, lines, hoses, liners, filler, insulation, gaps, and/or any other content. In some examples, the cables are welding cables that provide electrical power, welding consumables (e.g., the electrode 18, the shielding gas, coolant, and so forth), and/or other welding supplies to the torch 16.

The torch 16 also includes a gooseneck 46 extending out of the front end 44 of the handle 38. The gooseneck 46 is coupled between the handle 38 and a welding nozzle assembly 48. Welding consumables, such as filler wire and/or gas, generally travel through cable assembly 152 into the handle 38 (through the rear end 40), out of the handle 38 (through the front end 44), into the gooseneck 46, and then into the nozzle assembly 48. The torch 16 includes the trigger 22 for initiating a weld (and/or other welding-type operation) and/or supplying the electrode 18 to the weld. When the trigger 22 is pressed or actuated, welding wire (e.g., electrode 18) travels through the cable assembly 152, the handle 38, the gooseneck 46, and the welding nozzle assembly 48, so that the welding wire extends out of a front end 50 (i.e., welding end and/or torch tip) of the welding nozzle assembly 48. While the example torch 16 illustrated in FIG. 2 is designed for welding by a human operator, one or more torches designed for use by a robotic welding system may alternatively, or additionally, be used with the welding system of FIG. 1. For example, the torch 16 may be modified to omit the trigger 22, may be adapted for water cooling, etc.

Figure 3:
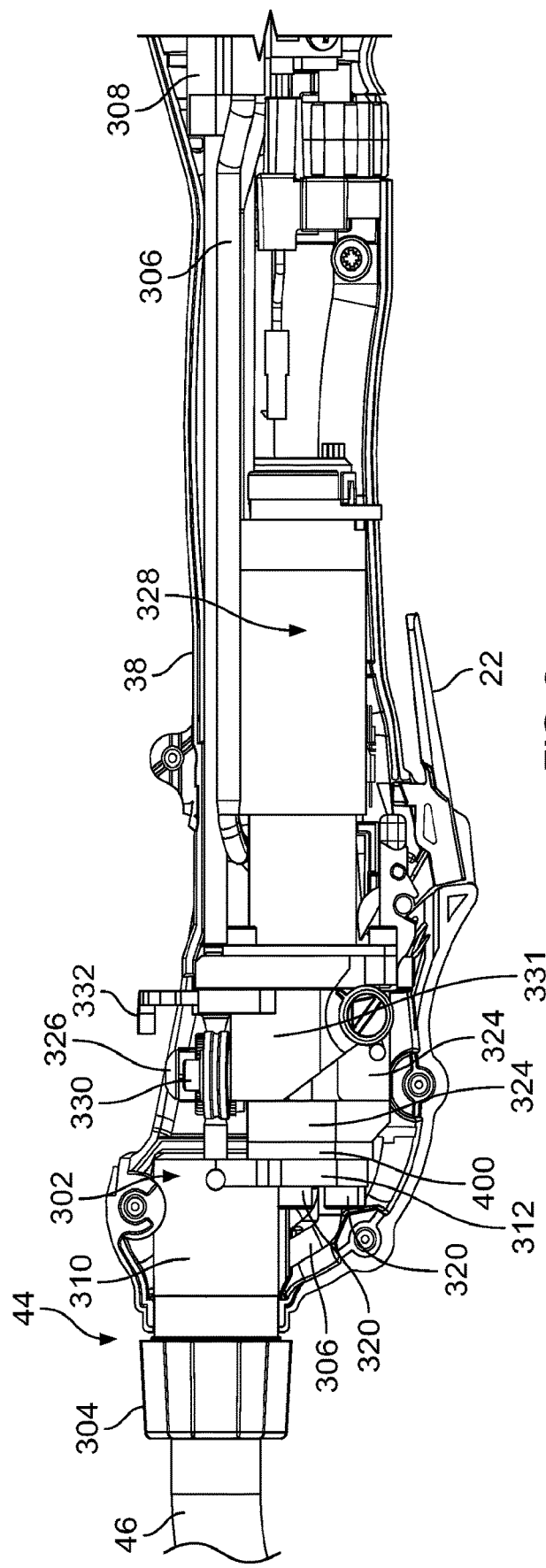
FIG. 3 is a side view of the example welding torch of FIG. 2, showing welding components within the handle, in accordance with aspects of this disclosure.
Figure 4:
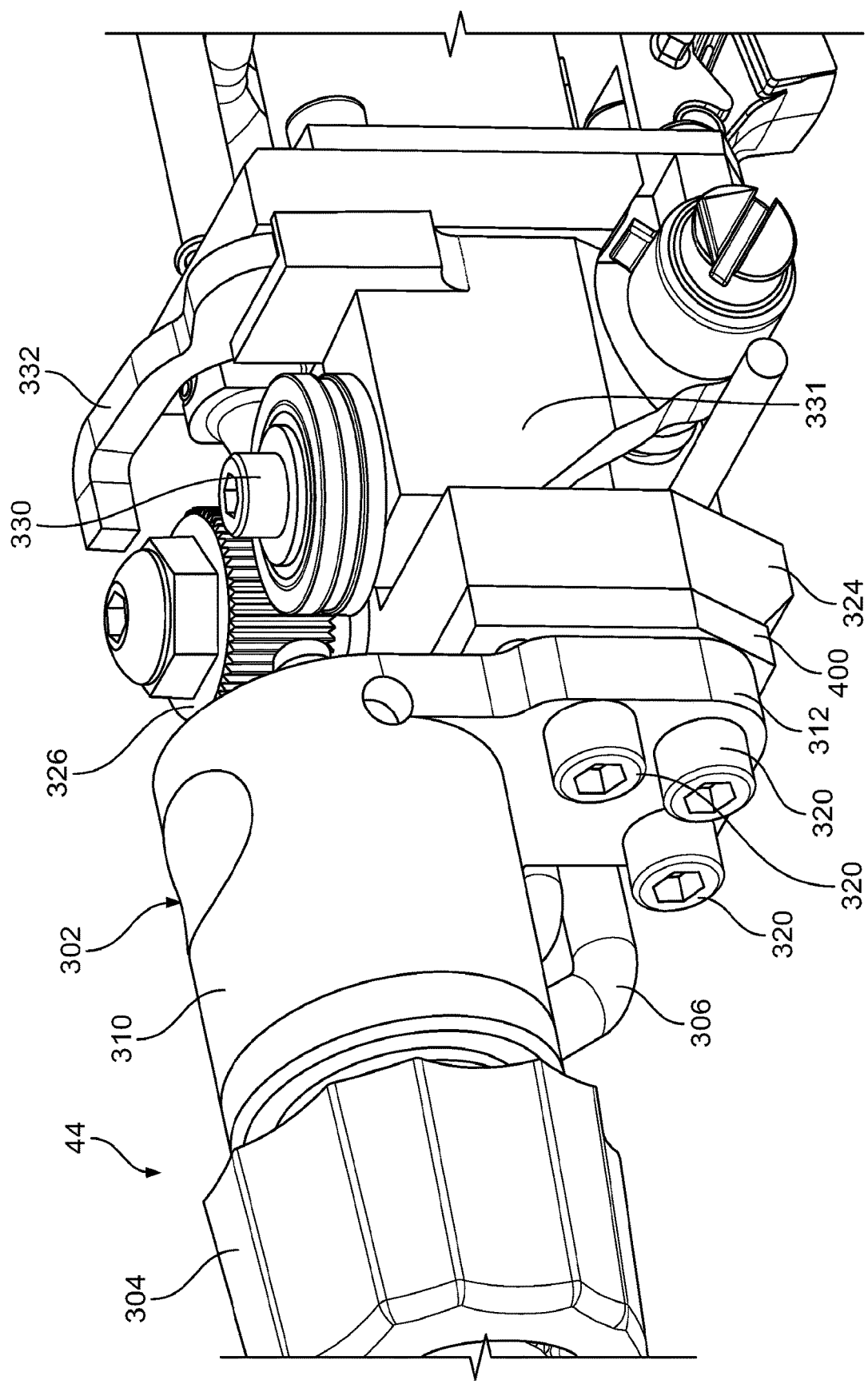
FIG. 4 is a perspective view of a portion of the welding components shown in FIG. 3, in accordance with aspects of this disclosure.
Figure 5:
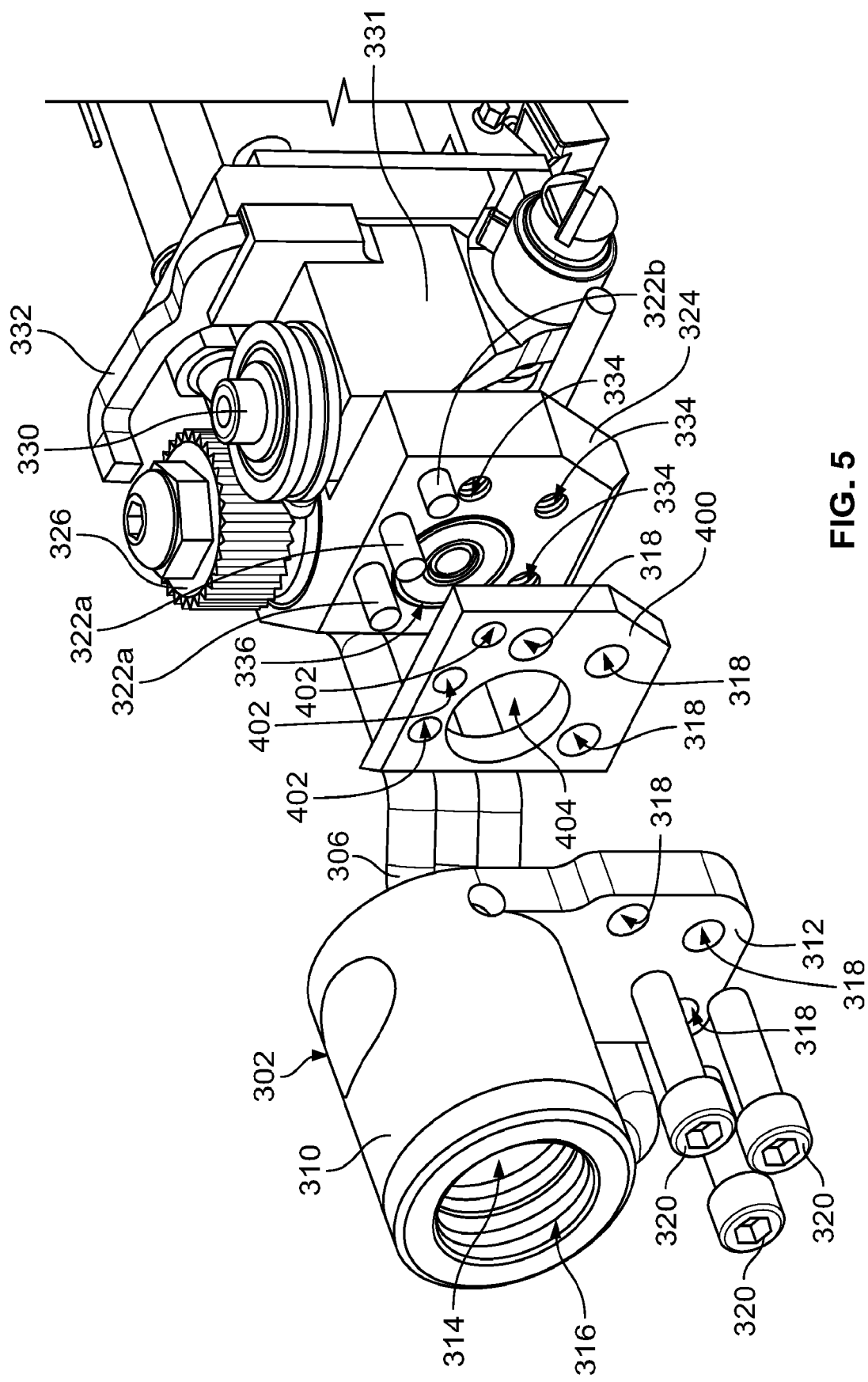
FIG. 5 is an exploded perspective view of the a portion of the welding components in FIG. 4 that are positioned adjacent a thermal insulating plate, in accordance with aspects of this disclosure.

FIGS. 3-5 show welding components within the handle 38 of the welding torch 16. A front housing 302 is coupled to the gooseneck 46 at the front end 44 of the handle 38. A cap 304 covers the connection between the gooseneck 46 and the front housing 302. The front housing 302 is comprised of an electrically conductive material, such as brass, for example. One or more conductors 306 (e.g. copper tubes) coupled to the front housing 302 are configured to conduct electrical energy to the front housing 302 from a rear housing 308. The rear housing 308 is also comprised of an electrically conductive material, such as brass, for example. The rear housing 308 is coupled to welding cables in the cable assembly 152 that provide electrical power from the power source 12.

In the example of FIGS. 3-5, the front housing 302 includes a cylindrical portion 310 and a plate portion 312. The cylindrical portion 310 includes a bore 314. The internal surface of the front housing 302 surrounding the bore 314 is formed with threaded grooves 316. The threaded grooves 316 are configured to engage screw threads of the gooseneck 46 to couple the handle 38 to the gooseneck 46. In some examples, the internal surface of the front housing 302 surrounding the bore 314 may be formed with screw threads configured to engage threaded grooves of the gooseneck 46. The plate portion 312 of the front housing 302 is substantially flat with bolt holes 318 configured to receive threaded bolts 320. The plate portion 312 also includes holes 318 to receive dowel pins 322 of a drive gearbox 324.

The drive gearbox 324 is comprised of a gear assembly (not shown) that drives a drive roll 326. The drive roll 326 includes splines configured to engage the wire electrode 18. The gear assembly of the drive gearbox 324 is driven by a motor 328. The gear assembly of the drive gearbox 324 translates motion of the motor 328 into motion of the drive roll 326. An idler roll 330 assists with the drive roll 326 engagement of the wire electrode 18. When the drive roll 326 is driven by the gear assembly of the drive gearbox 324, the drive roll 326 is configured to turn and engage the wire electrode 18 (with the idler roll 330) so as to move the wire electrode 18 through the handle 38 towards the torch tip 50. The drive gearbox 324 also includes a tension lever 332 configured to adjust a tension of the wire electrode 18 within the handle 38.

The drive gearbox 324 includes threaded bolt holes 334 configured to receive and/or engage the threaded bolts 320. The threaded bolt holes 334 are positioned on a lower and side portion of the drive gearbox 324, facing the front housing 302. The drive gearbox 324 further includes dowel pins 322 that extend from an upper portion of the drive gearbox 324 towards the front housing 302. The dowel pins 322a help to couple the drive gearbox 324 to the front housing. The dowel pin 322b serves as a pivot for a pressure arm 331, upon which the idler roller 330 is mounted. The drive gearbox 324 further includes a motor bearing 336 positioned between the dowel pins 322 and at least one of the threaded bolt holes 334. The motor bearing 336 supports a motor shaft (not shown) of the motor 328. The motor bearing protrudes from the drive gearbox 324 towards the front housing 302. In some examples, the motor bearing 336, threaded bolt holes, and/or dowel pins 322 may be positioned differently.

A thermal insulating plate 400 is positioned between the front housing 302 and the drive gearbox 324. The thermal insulating plate 400 is comprised of a thermally insulating material, such as a phenolic material, a thermoplastic material (glass filled or otherwise), a thermoset material (glass filled or otherwise), and/or ceramic material, for example. The thermal insulating plate 400 is configured to insulate the welding components (e.g. the motor 328) in the handle 38 from thermal energy (e.g. heat) conducted through the gooseneck 46 to the front housing 302 from the torch tip 50.

The front housing 302 abuts the thermal insulating plate 400 on a front side of the thermal insulating plate 400. The drive gearbox 324 abuts the thermal insulating plate 400 on a rear side of the thermal insulating plate 400. In the examples of FIGS. 3-5, the thermal insulating plate 400 is substantially flat, and formed in the shape of a seven sided polyhedron. In some examples, the thermal insulating plate 400 may be differently shaped. In the example of FIGS. 3-5, the thermal insulating plate 400 has a profile that approximately or identically matches a profile of the drive gearbox 324 facing the front housing 302.

In the example of FIG. 5, the thermal insulating plate 400 includes bore holes 318 configured to fit threaded bolts 320. The bore holes 318 are aligned with the bore holes 318 of the front housing 302 and the threaded bolt holes 334 of the drive gearbox 324. The thermal insulating plate 400 further includes pin holes 402 aligned with and/or configured to fit the dowel pins 322 of the drive gearbox 324. Additionally, the thermal insulating plate 400 includes a central bore 404 aligned with and/or configured to receive (and/or fit) the motor bearing 336. In the example of FIG. 5, the central bore 404 is substantially circular (and/or cylindrical), and is more than double the size of any bore hole 318 or pin hole 402.

When assembled, the threaded bolts 320 extend through the bore holes 318 of the front housing 302 and thermal insulating plate 400 to couple the front housing 302 and drive gearbox 324 together through the thermal insulating plate 400. The threaded bolt holes 334 of the drive gearbox 324 engage threads of the threaded bolts 320 to retain the threaded bolts 320 in a coupling engagement. The threaded bolts 320 may be formed of a metal material. In some examples, the threaded bolts 320 may be formed of a plastic, ceramic, glass, phenolic, thermoplastic, and/or thermoset material.

The dowel pins 322 of the drive gearbox 324 extend through the pin holes 402 of the thermal insulating plate 400. The dowel pins 322 are retained by pin holes (not shown) of the front housing 302 to provide additional coupling of the drive gearbox 324 to the front housing 302 through the thermal insulating plate 400. The dowel pins 322 may comprise a metal, plastic, ceramic, glass, phenolic, thermoplastic, and/or thermoset material.

In operation, an operator may use the welding torch 16 to perform a welding-type operation. The welding-type operation may produce substantial thermal energy proximate the torch tip 50 (e.g. from the arc 24). The nozzle assembly 48 may conduct the thermal energy (i.e. heat) from the torch tip 50 to the gooseneck 46. The gooseneck 46 may further conduct the thermal energy to the front housing 302. The thermal insulating plate 400 may substantially prevent, minimize, and/or reduce thermal energy conduction and/or transfer from the front housing 302 to the drive gearbox 324 (and/or to the motor 328 through the drive gearbox 324). Thus the thermal insulating plate 400 may operate as a heat dam to prevent and/or minimize heat damage to sensitive welding components (e.g. the motor 328) in the welding torch 16.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A handle of a handheld welding torch, at least a portion of the handle being configured to be held by a welding operator during a welding operation, the handle comprising:
   a front housing, wherein the front housing is configured for coupling to a gooseneck;
   a drive gearbox comprising gears configured to drive a drive roll, and a threaded bolt hole configured to receive and engage a threaded bolt;
   a thermal insulating plate positioned between the drive gearbox and the front housing, wherein the thermal insulating plate is comprised of a thermally insulating material;
   an outer housing enclosing the front housing, drive gearbox, and thermal insulating plate; and
   a trigger at least partly positioned within, or attached to, the outer housing.

2. The welding torch handle of claim 1, wherein the front housing comprises an electrically conductive material.

3. The welding torch handle of claim 1, wherein the front housing comprises a cylindrical portion and a connecting plate portion, wherein the cylindrical portion comprises a threaded inner surface surrounding a bore, wherein the threaded inner surface is configured to engage complementary threads of the gooseneck, and wherein the connecting plate portion comprises bolt holes configured to receive bolts to connect the front housing to the drive gearbox.

4. The welding torch handle of claim 1, wherein the drive roll is configured to engage a welding wire.

5. The welding torch handle of claim 1, further comprising a motor configured to drive the gears of the drive gearbox, wherein the motor comprises a motor shaft, and wherein the drive gearbox further includes a motor bearing that supports the motor shaft.

6. The welding torch handle of claim 5, wherein the motor bearing protrudes from the drive gearbox into a central bore of the thermal insulating plate.

7. The welding torch handle of claim 1, wherein the thermal insulating plate further comprises a pin hole configured to fit a dowel pin extending from the drive gearbox.

8. The welding torch handle of claim 1, wherein the thermal insulating plate comprises a bolt hole through which a bolt extends to connect the front housing to the drive gearbox.

9. The welding torch handle of claim 1, wherein the thermal insulating plate comprises a phenolic, thermoplastic, thermoset, or ceramic material.

10. A handheld welding torch, comprising:
    a nozzle assembly;
    a gooseneck coupled to at least a portion of the nozzle assembly;
    a trigger; and
    a handle attached to the trigger, at least a portion of the handle being configured to be held by a welding operator during a welding operation, the handle comprising:
      a front housing coupled to the gooseneck,
      a drive gearbox comprising gears configured to drive a drive roll,
      a motor configured to drive the gears of the drive gearbox, the motor comprising a motor shaft, and the drive gearbox further comprising a motor bearing that supports the motor shaft, and
      a thermal insulating plate positioned between the drive gearbox and the front housing, wherein the thermal insulating plate is comprised of a thermally insulating material.

11. The welding torch of claim 10, wherein the front housing comprises an electrically conductive material.

12. The welding torch of claim 10, wherein the front housing comprises a cylindrical portion and a connecting plate portion, wherein the cylindrical portion comprises a threaded inner surface surrounding a bore, wherein the threaded inner surface engages complementary threads of the gooseneck to couple the front housing to the gooseneck, and wherein the connecting plate portion comprises apertures configured to receive bolts to connect the front housing to the drive gearbox.

13. The welding torch of claim 10, wherein the drive roll is configured to engage a welding wire, and wherein the drive gearbox further comprises threaded bolt holes configured to receive and engage threaded bolts.

14. The welding torch of claim 10, wherein the motor bearing protrudes from a housing of the drive gearbox into a central bore of the thermal insulating plate.

15. The welding torch of claim 10, wherein the thermal insulating plate further comprises pin holes in which fit dowel pins extending from the drive gearbox.

16. The welding torch of claim 10, wherein the thermal insulating plate further comprises bolt holes through which bolts extend to connect the front housing to the drive gearbox.

17. The welding torch of claim 10, wherein the thermal insulating plate comprises a phenolic, thermoplastic, thermoset, or ceramic material.

18. The welding torch of claim 10, wherein the front housing, drive gearbox, and thermal insulating plate are positioned within an outer housing.

19. A welding torch handle, comprising:
    a drive gearbox comprising gears configured to drive a drive roll; and
    a front housing comprising a cylindrical portion and a connecting plate portion,
      the cylindrical portion comprising a threaded inner surface surrounding a bore, the threaded inner surface configured to engage complementary threads of a gooseneck, and the connecting plate portion comprising bolt holes configured to receive bolts to connect the front housing to the drive gearbox; and a thermal insulating plate positioned between the drive gearbox and the front housing, wherein the thermal insulating plate is comprised of a thermally insulating material.

\* \* \* \* \*